UNITED STATES PATENT OFFICE.

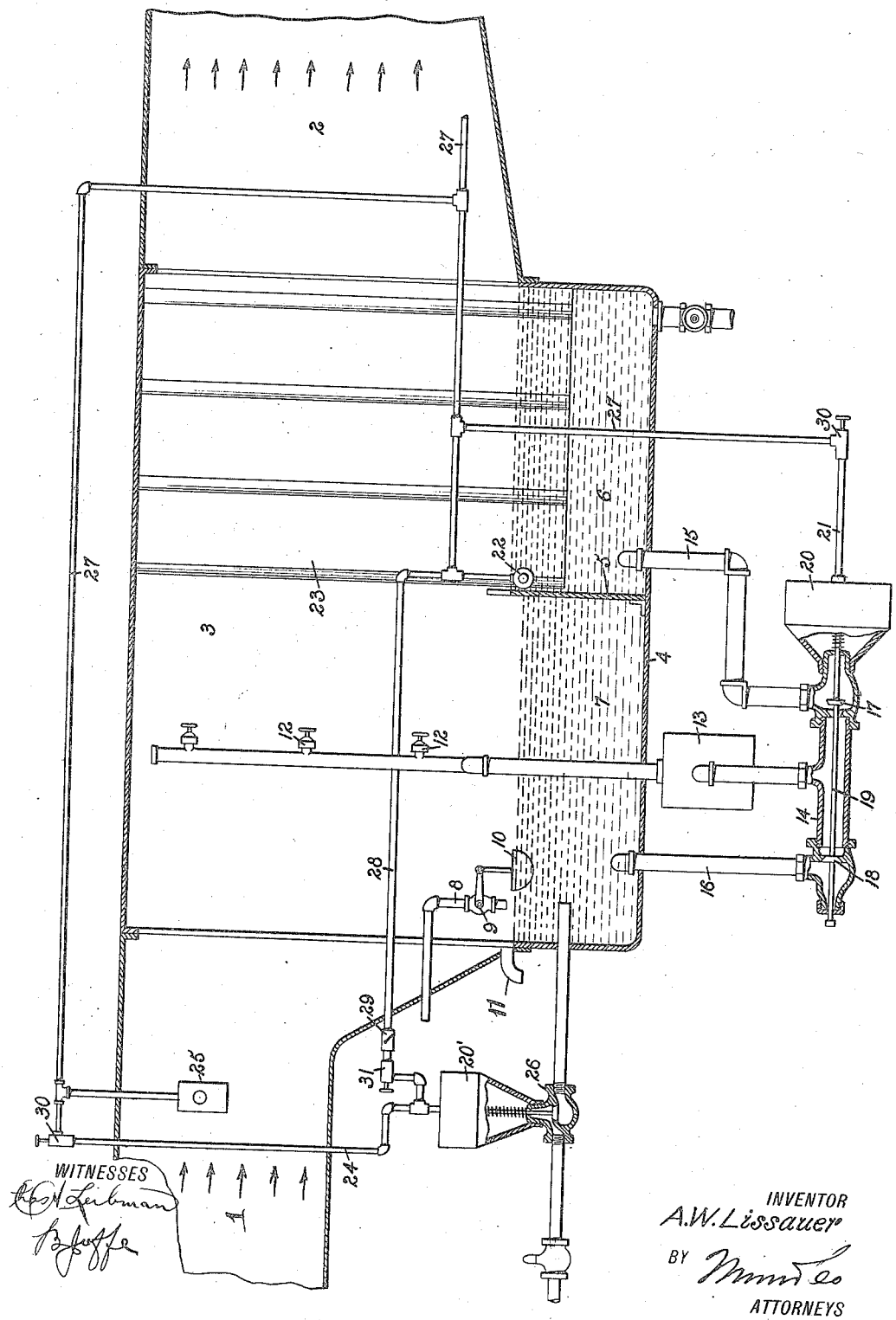

ADOLPH W. LISSAUER, OF NEW YORK, N. Y.

APPARATUS FOR PURIFYING AND HUMIDIFYING AIR.

1,254,612.  Specification of Letters Patent.  Patented Jan. 22, 1918.

Original application filed August 22, 1916, Serial No. 116,266. Divided and this application filed May 4, 1917. Serial No. 166,344.

*To all whom it may concern:*

Be it known that I, ADOLPH W. LISSAUER, a citizen of the United States, and a resident of the city of New York, borough of Manhattan, in the county and State of New York, have invented a new and Improved Apparatus for Purifying and Humidifying Air, of which the following is a full, clear, and exact description.

The subject matter of this application is subdivided from my application Serial No. 116,266, filed August 22, 1916, and issued November 6, 1917, under Patent No. 1,245,247.

The object of the invention is to provide an apparatus for controlling the temperature of the moisture supplied to the air so as to deliver said air at a constant saturation temperature or absolute humidity.

In the accompanying drawing, forming part of the application, the figure represents a diagrammatic, sectional view through the apparatus embodying my invention.

Referring to the drawings, 1 is an air conduit spaced from a similar conduit 2 by a chamber 3 which extends below the conduits to form a sump 4. The chamber has a partition 5 raised from the bottom thereof transversely of the conduits whereby the sump is divided into two compartments 6 and 7. A water inlet 8 is provided for the compartment 7 of the sump and the valve 9 of the said inlet is controlled by a float 10. An over flow 11 is formed from said compartment 7 whereby the level of water in said compartment 7 is maintained constant. The partition 5 rises above the overflow 11, consequently liquid may flow from the compartment 6 into the compartment 7, but not vice versa.

A plurality of sprinklers or nozzles 12 are provided in the chamber 3 above the compartment 7 in the path of the air current moving in the direction indicated by the arrows. The water is supplied to the nozzles by a pump 13, the inlet of which is connected to a mixing valve 14 which has a conduit 15 leading to the compartment 6 and a conduit 16 leading to the compartment 7. The flow from conduits 15 and 16 to the pump 13 is controlled by valves 17 and 18 respectively, the two valves being mounted on a single stem 19 to move in synchronism. The distance between the two valves is such that there can always be a flow through one of the conduits at least, and there may be a flow through both of the conduits.

The stem 19 extends out of the mixing valve to engage a diaphragm mechanism 20 to one side of which air pressure may be applied from a conduit 21. The air pressure supplied to the diaphragm mechanism 20 is controlled by a thermostat 22 located in the compartment 6, or, if desired, in a separator 23 provided in the chamber above the compartment 6 in the path of the air current. The separator eliminates the excess of moisture which, in the shape of water particles, may be carried away by the current of the air when the mist is formed in the current by the nozzles 12.

The water in compartment 7 is heated from any suitable source, as, for example, steam supply. The valve 26 of the supply is controlled from a diaphragm mechanism 20' which is subjected to compressed air through a conduit 24. The pressure of the air flowing to the diaphragm mechanism 20' is controlled by a thermostat 25 located in the air conduit 1. The thermostat is surrounded by some substance which is maintained moist so that the temperature controlling the thermostat is the wet bulb temperature. In place of the thermostat, a hygrometer may be used; in which case the absolute humidity would control the diaphragm mechanism 20'. Both diaphragm mechanisms 20 and 20' are supplied from the same source of compressed fluid through conduits 27. A conduit 28 connects the conduit 24 to that part of the conduit 27 which is connected to the thermostat 22. A check valve 29 is provided in the conduit 28 which prevents the flow of air toward the conduit 24. This connection permits the thermostat 22 to influence the valve 26 through the thermostat 25.

The thermostats used are of the type which vary fluid pressure on the diaphragm valve by variable leakage of air controlled by the temperature to which the thermostats are exposed. Other types of thermostats can be used, either operated by compressed air or other fluids, or by other means. The air pressure from the conduits 27 to the diaphragm mechanism is controlled by throttling devices 30. A throttling device 31 is also provided on the conduit 28 between the check valve 29 and the conduit 24.

The thermostat 22 controls the position of the valves 17 and 18 and, therefore, controls the mixture of water coming from the compartments 6 and 7. The thermostat 25 controls the heat supplied through the valve 26, The said thermostat 25 is so constructed that when it is set for a certain temperature and is surrounded by air cooler than the temperature the tendency is to decrease the fluid pressure leak through it and, therefore, shunt more pressure on the diaphragm mechanism 20', which will operate the valve to increase the supply of heating medium, thereby increasing the temperature of the water in the compartment 7. As the temperature of the air surrounding the thermostat 25 reaches the predetermined temperature, the air leak therein increases in turn decreasing the pressure on the diaphragm mechanism 20', thereby reducing the supply of heating medium and, consequently, lowering the temperature of the water in compartment 7. The rapidity of the leak and, therefore, the movement of the diaphragm 20' is controlled by the throttle 30. The valve 26 which controls the supply of heating medium is of the reverse-acting type, so that in case of failure of air pressure the valve will automatically close and shut off the supply of heating medium, thus preventing overheating.

The thermostat 22 is of a similar structure and it is set to decrease air leak when the temperature surrounding it is lower than the set temperature. Consequently more air pressure will be exerted on the diaphragm mechanism 20, in consequence of which displacement the valve 17 approaches its seat and the valve 18 is displaced further from its seat. Therefore, a larger quantity of heated water will enter from the compartment 7 and a lesser quantity of cooler water will enter from compartment 6. If the surrounding temperature of thermostat 22 is higher than the set temperature the air leak increases. There is a decrease of pressure on the diaphragm mechanism 20 and, consequently, the supply of heated water is decreased and that of cool water is increased. It will be noted that the mixing valve 14 is of the balancing type; consequently, the slightest variation in pressure on the diaphragm mechanism is quickly responded to by the mixing valve.

The thermostat 25 is so set that the water in compartment 7 is maintained at a slightly higher temperature than necessary to heat the spray water to the required temperature when mixed with a predetermined quantity of water from compartment 6. This predetermined quantity of water from compartment 6 is obtained by synchronizing the displacement of the mixing valve 14 and the valve 26 through the medium of the thermostat 22. The temperatures therein referred to are wet-bulb temperatures.

Assuming the thermostat 22 is set to maintain a temperature leaving conduit 2 of $T_e$. Thermostat 25 is set to close the valve 26 at an increase in temperature determined to be a certain number of degrees above $T_e$ or $(T_e+A)$. When the entering temperature falls below this point $(T_e+A)$ the air leak in 25 decreases and tends to open the valve 26, heating the water in compartment 7 to a point above that required to heat to $T_e$. When the water in compartment 7 is mixed with a predetermined quantity of water from compartment 6 the tendency is also to heat the water in compartment 6 or the moisture in the separator above $T_e$. In consequence the thermostat 22 increases the air leak, tending to reduce pressure on the diaphragm mechanism 20 and allowing more of the cooler water coming from compartment 6 to mix with less of the heated water from compartment 7.

Due to the same cause, air pressure will be reduced on the diaphragm mechanism 20' of the valve 26 through the medium of the conduit 28. Therefore the valve 26 will move to the closing point in proportion to the movement of the mixing valve 14, which has increased the quantity of cooler water and decreased the amount of the hotter water. The leak of air through the conduit 28 is controlled by the throttling device 31, so that any desired proportion of the displacement between the valves may be obtained. This displacement of the valve 26 reduces the supply of heat to compartment 7, consequently reduces the temperature of the excess of moisture in the separator 23 and, therefore, the water in compartment 6.

Due to the drop of temperature the leak in the thermostat 22 decreases and the mixing valve returns to the normal position. By controlling the valve 26 by the two thermostats 22 and 25 it is possible to control the temperature of the water in compartment 7 to the fraction of a degree, even if the temperature of the entering air is not constant. When the initial temperature of the air current is $T_e+A$, the system is inoperative with the heating medium. By substituting a cooling medium for the heating medium, the action of the apparatus reverses and the same method becomes applicable.

I claim:

1. An apparatus for purifying and humidifying air, comprising in combination,—an air chamber having a sump divided into two parts, said chamber having means whereby air may be circulated through the chamber across the two parts of the sump, means for supplying and heating the water in one part of sump, a thermostat affected by the temperature of the air current entering the chamber for controlling the supply of heat, said part of sump having an overflow to maintain the water level therein constant and below the water level in the other part, spray-forming means in the path of the air current, means for eliminating the excess of moisture from the air and directing it to said other part of sump, a pump for driving water to the spray-forming means, means for supplying to the pump a mixture of water from both parts of the sump, a second thermostat affected by the temperature of the water in the said other part of the sump for controlling the mixture, and the heating means independently of the first mentioned thermostat.

2. An apparatus for purifying and humidifying air, comprising in combination,—an air chamber having a sump divided into two parts, said chamber having means whereby air may be circulated through the chamber across the parts of the sump, means for supplying and heating the water in one part of the sump, a thermostat influenced by the wet-bulb temperature of the air current entering the chamber controlling the heating means, said one part of sump having an overflow to maintain the water level therein and below the water level in the other part, spray-forming means in the path of the air current, a separator for eliminating the excess of moisture from the air current and adapted to direct the excess of moisture to said second part of the sump, a pump adapted to draw water from either or both sumps and discharge to the spray-forming means, a mixing valve interposed between the pump and the two sumps, and a thermostat affected by the temperature of the water in said second part of sump for controlling the mixing valve, whereby various quantities of water from either part of sump may be supplied to the pump.

3. An apparatus for purifying and humidifying air, comprising in combination,—an air chamber having a constant supply of water, said chamber having means whereby an air current can be circulated through the chamber, means for heating the water supply, means influenced by the initial wet-bulb temperature of the air entering the chamber controlling the heating means, spray-forming means in the chamber in the path of the air current, a separator for eliminating the excess of moisture caused by the spray forming means, said chamber having means for collecting the excess of moisture coming from the separator, means for mixing the water from the supply with that collected from the separator, a thermostat influenced by the temperature of the water collected from the separator for controlling the mixing means, said thermostat having means adapted to influence the heating means of the supply, and a pump for supplying the water mixture to the spray-forming means.

4. An apparatus for purifying and humidifying air, comprising in combination,—an air chamber through which an air current can be created, a water supply, means for heating the water, means influenced by the initial wet-bulb temperature of the air current entering the chamber for controlling the heating means whereby the temperature of the water may be varied, spray-forming means in the path of the air current, a separator in the path of the air current for eliminating the excess of moisture caused by the spray-forming means, means for collecting the moisture removed by the separator, means for forming a mixture of waters from the supply and that collected from the separator, a thermostat influenced by the temperature of the moisture collected by the separator for controlling the mixing means, means connecting said thermostat with the heating means whereby the heating means are adapted to be controlled by said thermostat independently of the thermostat controlling said heating means, and a pump for delivering the mixture to the spray-forming means.

5. An apparatus for purifying and humidifying air, comprising in combination,—an air chamber through which an air current may be passed, means for supplying moisture to the air current, means for eliminating the excess of moisture supplied, a supply of water, means for heating the supply of water, a thermostat influenced by the initial wet-bulb temperature of the air current entering the chamber for controlling the heating means, means for forming a mixture of the water collected and that from the supply before delivering it to the means for supplying moisture, and a thermostat affected by the temperature of the moisture collected for controlling the mixing means and the heating means.

ADOLPH W. LISSAUER.